United States Patent [19]

Blatz et al.

[11] 4,331,415
[45] May 25, 1982

[54] AUTOMATIC BUNDLE FORMING APPARATUS

[75] Inventors: Glenroy G. Blatz, Kiel; Burdette A. Petersen, Plymouth, both of Wis.

[73] Assignee: H. G. Weber & Co., Inc., Kiel, Wis.

[21] Appl. No.: 162,133

[22] Filed: Jun. 23, 1980

[51] Int. Cl.³ .............................................. B65G 57/30
[52] U.S. Cl. ..................................... 414/52; 198/800; 414/96
[58] Field of Search ....................... 414/52, 92, 93, 95, 414/96; 198/607, 796, 800, 801; 271/212; 53/541

[56] References Cited

U.S. PATENT DOCUMENTS 2,365,782 12/1944 Stevenson ...................... 198/801 X
3,330,425 7/1967 Reda ................................ 414/96 X
3,517,482 6/1970 Beninger ......................... 414/96 X
3,619,976 11/1971 Kerker ............................. 414/52 X
3,664,482 5/1972 Kornylak ....................... 198/800 X

FOREIGN PATENT DOCUMENTS 1385484 12/1964 France .................................. 414/92
136078 10/1979 Japan .................................... 414/93

*Primary Examiner*—Leslie J. Paperner
*Attorney, Agent, or Firm*—Hill, Van Santen, Steadman, Chiara & Simpson

[57] ABSTRACT

Apparatus for automatically assembling hands or stacks of generally flat material such as bags or the like into vertically aligned bundles for wrapping or banding in which the stacks to be assembled are conveyed into an accumulating area and are individually elevated by a lifting mechanism into a gathering frame for forming into bundles or bales of desired height.

9 Claims, 5 Drawing Figures

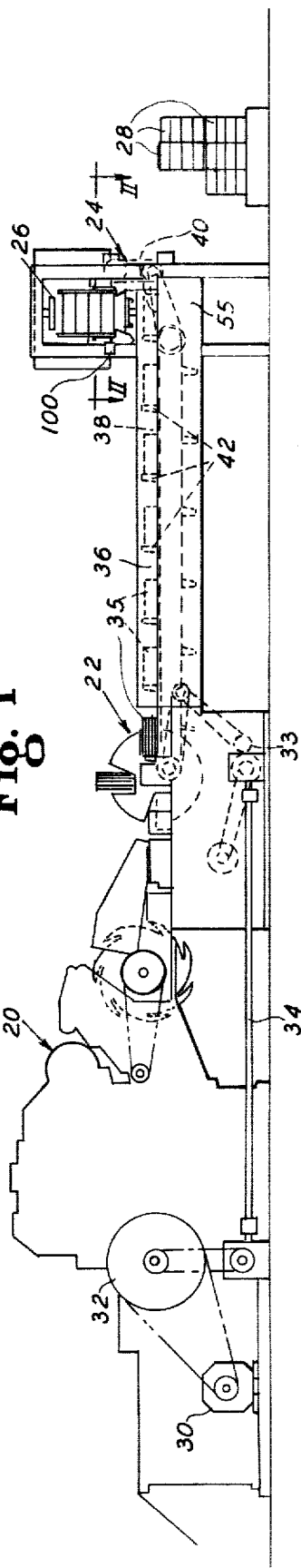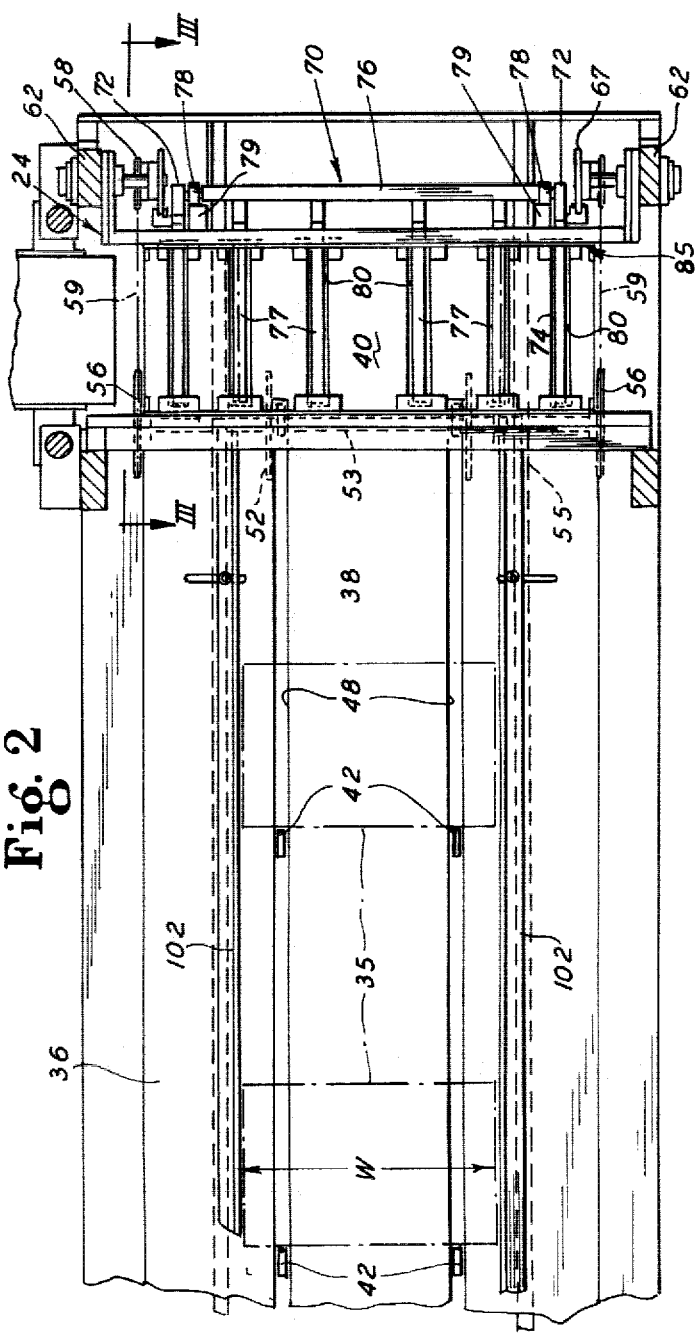

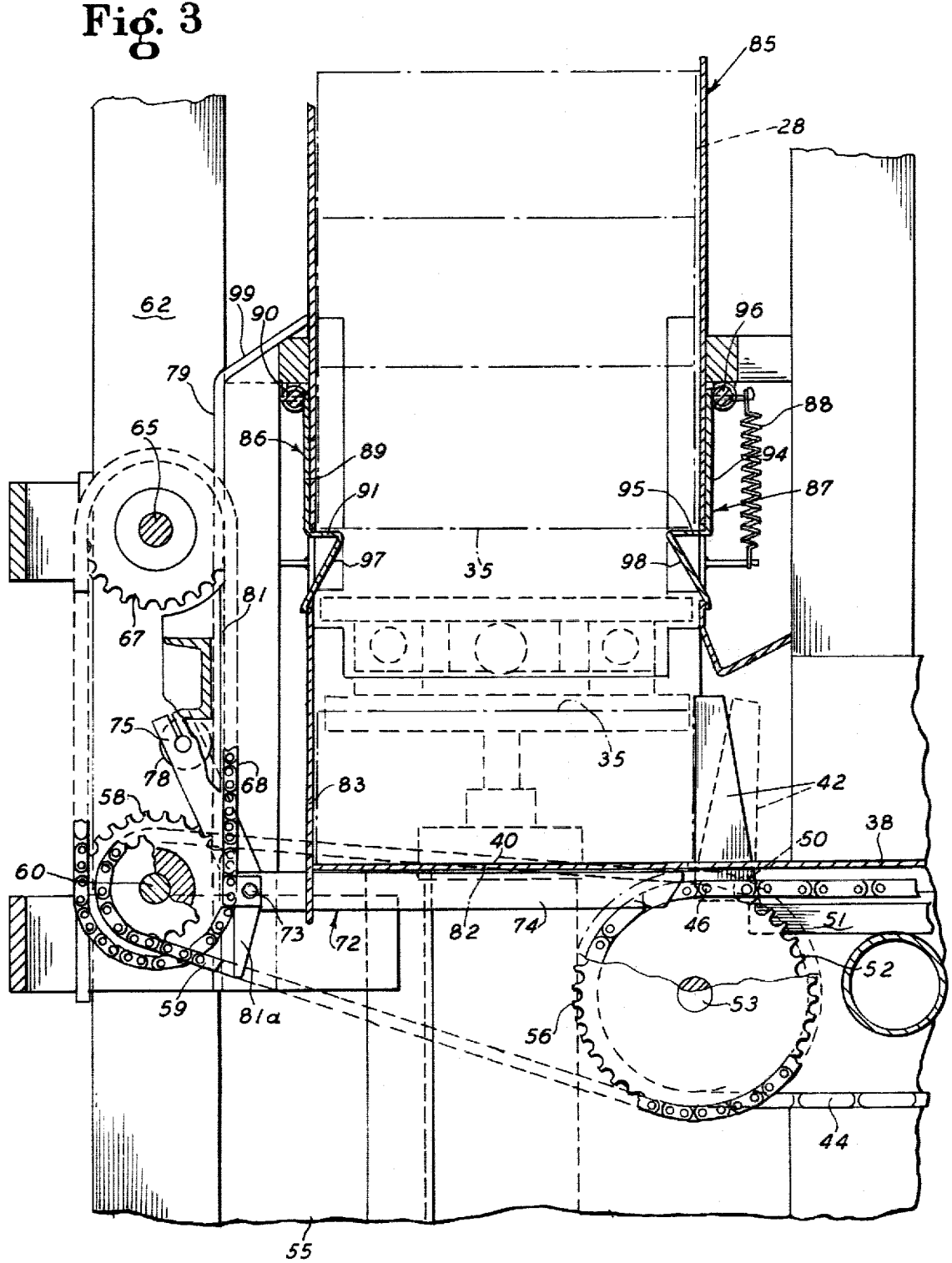

AUTOMATIC BUNDLE FORMING APPARATUS

BACKGROUND OF THE INVENTION

1. Field of the Invention

The present invention relates generally to a mechanism for automatically assembling stacks of bags or the like into bundles and more particularly, to a high speed, continuous motion mechanical lifting device which removes stacks from a conveying surface and elevates them into a gathering frame to form bundles which may be conveniently wrapped for shipping and storage.

2. Prior Art

In the past stacks of bags advancing along the conveyor of a collating and stacking machine were individually removed from the conveying surface by a series of cam controlled fingers which tilted the stacks on their sides while moving them into a stack collecting apparatus in a relatively unstable orientation. This stack collecting apparatus extends horizontally from the conveyor with a considerable additional floor space required and having a high degree of complexity necessitating much in the way of adjustments and service. Portions of the stack collecting apparatus were shown and described in "Automatic bag collating and stacking apparatus" invention which is the subject of commonly assigned U.S. Ser. No. 053,027, filed June 28, 1979 on behalf of Arthur H. Kidd. Prior to the above machine most all bundle forming operations were preformed by hand operations. However, since hand operations can no longer keep pace with the high production rates associated with modern bag manufacturing machines, it would be a decided advance in the state of the art to provide an automatic bundle forming apparatus which is a simple compact device and which can be used in connection with a high production bag manufacturing operation which can assemble bundles which are stable, vertically aligned and uniform in size and quantity.

SUMMARY OF THE INVENTION

This invention is directed to an improved automatic bundle forming apparatus or gathering unit which assembles stacks or piles of generally flat material into vertically aligned bundles of desired count for wrapping or banding. For purposes of the preferred embodiment, the present invention is described in terms of handling stacks of flattened bags produced in a bag manufacturing operation and is shown as used in combination with a bag collating and stacking apparatus at the discharge or accumulating end thereof.

The bundle forming apparatus is mechanically driven by a roller chain from the conveyor of the collating and stacking apparatus which provides synchronization for a liftingmechanism to individually elevate preformed stacks from the conveyor and load the stacks into a gathering frame, positioned above the conveyor, to produce bundles of a desired size. The lifting mechanism is arranged to accept each stack as it arrives at the accumulating end of the conveyor and raise it past a pair of spring loaded catch plates into the gathering frame. A cam arrangement provides a supporting posture for the lifting mechanism when raising the stack and retracts the lifting mechanism when recycling the mechanism downward to receive the next stack. As the lift mechanism is withdrawn from below the stack at the top of the lift cycle the stack is supported on the catch plates and a bundle develops as each stack is added to the bundle from below. After a desired number of stacks have been assembled in the accumulating frame they are compressed and wrapped or banded in bundles or bails for shipping and storage. The lifting mechanism is entirely mechanical and operates with a continuous comparatively high speed motion.

Other features, advantages and objects of the invention will be readily apparent from the following description of a preferred embodiment thereof, taken in conjunction with the accompanying drawings.

BRIEF DESCRIPTION OF THE DRAWINGS

FIG. 1 is a generally diagrammatic side elevational view of a bag fabricating, collating and stacking apparatus in which a bundle forming apparatus of the present invention has been incorporated;

FIG. 2 is a fragmentary longitudinal sectional view taken generally along the lines II—II of FIG. 1;

FIG. 3 is a vertical sectional view taken generally along the lines III—III of FIG. 2;

DESCRIPTION OF THE PREFERRED EMBODIMENT

Figure 4:
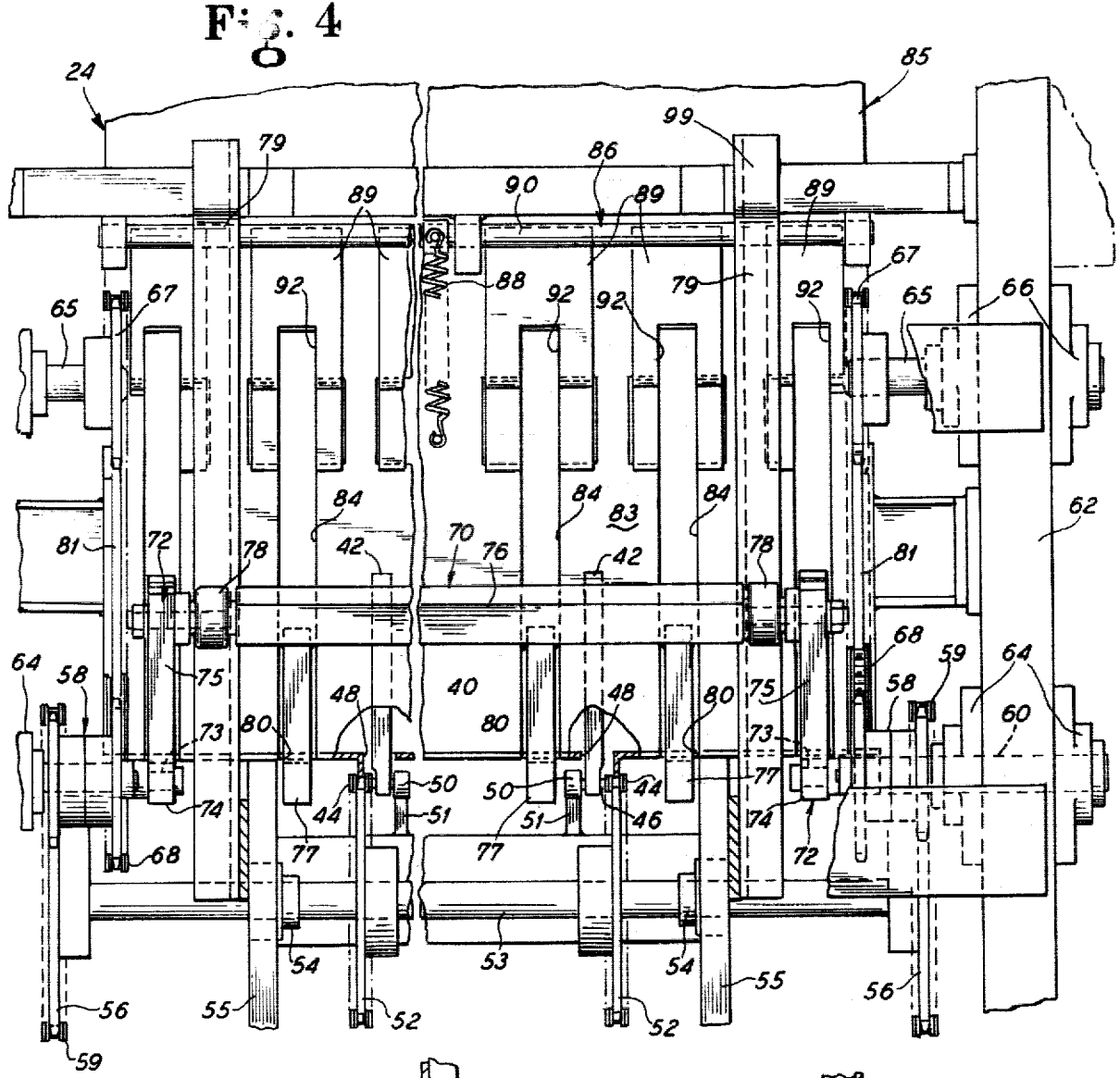
FIG. 4 is a fragmentary end elevational view of the bundle forming apparatus of FIGS. 2 and 3.

A high production, synchronized bag manufacturing system is shown in FIG. 1 including a bag machine 20, a collating and stacking apparatus 22, an automatic bundle forming or stack gathering device 24, and a compression and wrapping unit 26. This bag manufacturing system produces a bail or bundle of vertically aligned flattened bags of a uniform dimension and stable in form which may be easily stacked for shipping or storage.

The bag machine 20 is powered by a motor 30 with all forming functional elements driven in synchronism through the use of a suitable gear train 32. The gear train 32 also powers a drive gearing 33 of the collating and stacking apparatus 22 by means of a power take-off arrangement 34.

The bag machine 20 delivers a continuous stream of collapsed and flattened bags to the collating and stacking machine 22 which are collected in stacks 35 of a desired count and transferred to a discharge flight conveyor 36 for travel therealong in a spaced aligned orientation for downstream movement. The stacks 35 advance along a conveyor pan 38 of the conveyor 36 to a discharge or accumulating end 40 thereof which comprises the receiving station for the automatic bundle forming device 24.

The conveyor 36 provides a plurality of upstanding flights 42 drivably connected to a pair of spaced endless roller chains 44 for advancing the stacks along the conveyor pan 38. The chains 44 are driven from the drive gearing 33 below the pan 38 with the flights connected to the roller chains at uniform spacing by pivot pins 46. The flights extend upward through longitudinal passageways 48 which run the length of the conveyor pan 38 with a pair of flights, one carried by each chain, arranged to move an individual stack 35 downstream to the accumulating end 40. As best seen in FIGS. 3 and 4 each flight 42 is maintained in a vertical conveying orientation by a roller 50 carried by each flight which are supported on rails 51 extending the length of the conveying surface of the conveyor pan 38. The rails 51 terminate at the point at which a stack has been fully advanced into the accumulating end 40 or receiving station of the bundle forming device 24 by a pair of flights 42. As the chain continues to move and related rollers 50 run off of the rails 51, the flights 42 fall away from the stack 35 by pivoting backward and downward about the pins 46 (shown in broken lines in FIG. 3) and will drop down below the conveying surface of pan 38 moving with the chains 44 about sprockets 52 along the chain return run back to the forward end of the conveyor 36. The sprockets 52 are mounted on a foot shaft 53 which is rotatably journaled in suitable bearings 54 supported in frame plates 55 of the conveyor 36. Each end of the foot shaft 53, extending outward from a related frame plate 55, drivably carries a sprocket 56 which in turn drives a double sprocket 58 by means of a roller chain 59. Each double sprocket 58 is mounted on a shaft 60 which are supported from spaced vertical frame members 62 on bearings 64. A second set of shafts 65, are also supported on the vertical frame members 62 directly above the shafts 60 by means of bearings 66, with each shaft 65 carrying a sprocket 67. A chain 68 is orbitally driven about the double sprocket 58 and the sprocket 67 at each side of the bundle forming device 24 as best seen in FIG. 4.

A lift mechanism, generally designated 70, is connected to the chains 68 for orbital travel therewith. The lift mechanism includes a pair of spaced bell crank members 72, each of which are pivotably connected to a related one of the chains 68 by means of a pivot pin 73 and having an elongated elevating finger portion 74 and a short leg portion 75. A transverse bar 76 rigidly interconnects the leg portions 75 of the members 72 at their upper ends and provides a hanger support for a series of intermediate elevating fingers 77. It will be understood that the fingers 74 and 77 are all horizontally aligned relative to one another to provide a series of generally flat lifting surfaces for contacting the underside of the stacks 35.

Adjacent each of the bell crank members 72 and rotatably carried on the transverse bar 76 are a pair of cam rollers 78, each of which are guided for travel along a cam track 79. After the chains 68 move the lift mechanism 70 around the double sprocket 58 and proceed upward, as shown in FIG. 3, the elevating fingers 74 and 77 pass through complementary cut out areas or slots 80 in the accumulating end 40 of the conveyor pan 38 and proceed to engage the lower face 82 of a waiting stack 35. It will be seen that since the lift mechanism 70 is chain driven from the conveyor 36 relative synchronization therebetween is assured; whereby a stack of bags 35 will have been moved into position in the accumulating end of the conveyor immediately before the elevating fingers move into position to elevate the stack.

A vertical guide plate 83, provided at the downstream end of the conveyor pan 38 is also slotted at certain locations as at 84 (see FIG. 4) to permit the fingers to pass therethrough during the lifting phase of operation. The cam rollers 78 in cooperation with the cam tracks 79 maintain the elevating fingers 74 and 77 in a horizontal stack supporting orientation up into a gathering frame 85. Further, chain guides 81 and stabilizing fingers 81a cooperate with the upward moving chain runs to insure the fingers are held in the horizontal attitude.

Figure 5:
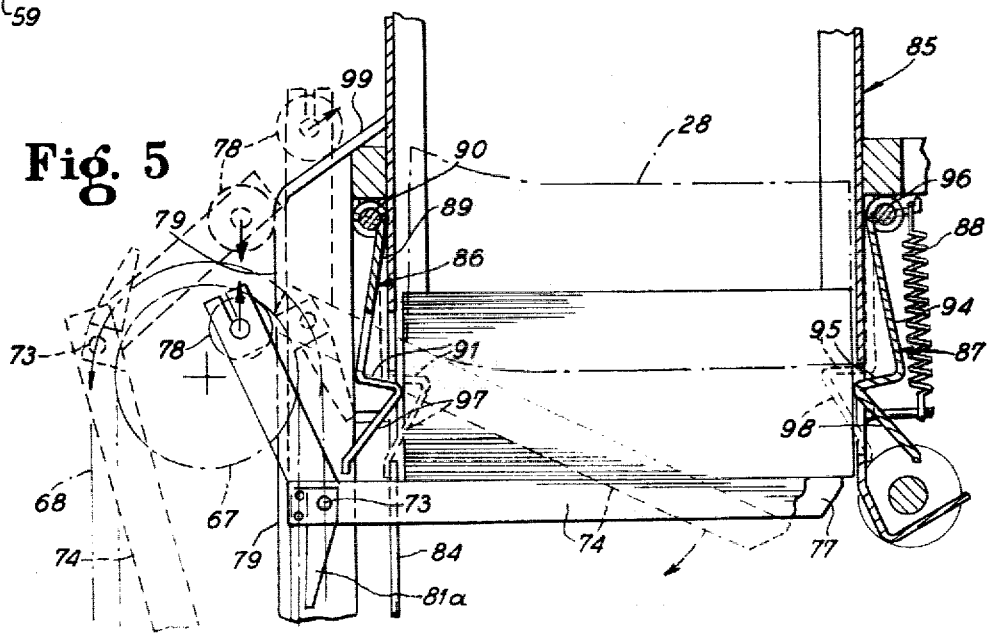
FIG. 5 is a fragmentary sectional view showing the motion of the lifting mechanism in connection with elevating a stack of bags into the gathering frame.

A pair of spring loaded catch plate assemblies 86 and 87 are mounted at opposite sides of the gathering frame 85 and are deflected outwardly to allow the stack to pass by (as best seen in FIG. 5). After the stack moves into the gathering frame 85 the catch plate assemblies 86 and 87 are free to shift back to a supporting position with the urging of springs 88. The catch plate assembly 86 includes a series of spaced, bent plates 89 welded to a pivot shaft 90 to form an intermittent supporting ledge 91 for one side of the bundle being assembled in the gathering frame 85. The bent plates 89 are slotted as at 92 to cooperate with the slots 84 of the guide plate 83 to accommodate the upward movement of the elevating fingers into the gathering frame 85.

The catch plate assembly 87 is generally similar to the catch plate assembly 86 and includes spaced bent plates 94 having a ledge 95 formed therein for supporting a side of the bundle opposite of the side supported by the plates 89. The plates 94 are secured to a pivot shaft 96 and both shafts 90 and 96 are pivotally carried on the gathering frame 85. Each of the plates 89 and 94 are provided with angled cam faces, 97 and 98 respectively and serve to deflect the catch plate assemblies 86 and 87 outward against the bias of a related spring 88 to allow a stack 35 to be received in the gathering frame 85.

As best seen in FIG. 5 after the lifting mechanism 70 raises a stack 35 into the gathering frame 85 when adding to a partially formed bundle 28, the catch plate assemblies are again urged back into a supporting position. At this time the cam rollers 78 follow along an angled portion 99 of the cam tracks 79 which causes the elevating fingers 74 and 77 to move out from under the stack 35 and following along with the chain 68 around the sprocket, to move out of the gathering frame 85 as shown in broken line positions of FIG. 5.

It will be understood that as a stack 35 is raised into the gathering frame 85 a stack previously elevated and supported on the catch plate assemblies will be picked up and supported on the top of the stack being elevated.

The elevating fingers after leaving the gathering frame, move downward to below the conveying level of the pan 38 as the pivot pins 73 follow the chains 68 around the double sprockets 58. At this point the elevating fingers 74 and 77 are placed back in the horizontal position (as shown in FIG. 3) and upon rising, lift the next stack 35 of precounted bags delivered into the accumulating end 40 of the conveyor 36, up into the gathering frame 85. The conveyor chain 44 and the lift mechanism drive chain 68 travel at a constant speed and at a given ratio therebetween such that the elevating fingers of the lift mechanism 70 makes one complete rotational cycle during the time that a pair of flights 42 of the conveyor 36 advances one stack into position for elevating.

After a predetermined number of precounted and oriented stacks have been assembled in the gathering frame 85, they are compressed and wrapped or banded by the compression and wrapping unit 26 into bundles 28 for storage and shipping. The construction and mode of operation of the unit 26 may be of any suitable arrangement that is compatible with the present invention. The details of the unit 26 are not shown since such details do not comprise a part of this invention. A suitable automatic control circuit (not shown) which includes a counting switch 100 or the like (FIG. 1) may be utilized to provide automatic sequencing of the compressing and wrapping operation.

The lift mechanism 70 and the gathering frame 85 are constructed with sufficient width to handle various stack widths. For example as shown in FIG. 2, stacks of a dimension 'W' are advanced along the conveyor 36 into the bundle forming device 24 in which case only the intermediate elevating fingers 77 are used to lift the stacks into the gathering frame 85. The elevating fingers 74 are utilized when wider stacks are handled by the bundle forming device 24. Spaced side guides 102 maintain the stacks on a centered course of travel along the conveyor 36. When wider stacks are to be assembled into bundles the side guides 102 only need to be adjusted outwardly to conform to the stack dimension for guiding the stacks into the gathering frame 85.

While this invention has been shown and described in connection with assembling stacks of flattened bags into bundles, it should be understood that our invention may be equally well suited to form bundles of other flat materials to efficiently and rapidly produce bundles for wrapping or banding. Further, although various modifications may be suggested by those versed in the art, it should be understood that we wish to embody within the scope of the patent warranted hereon all such modifications as reasonably and properly come within the scope of our contribution to the art.

We claim as our invention:

1. In an automatic high speed bundle forming apparatus arranged to assemble preformed and aligned stacks of generally flat material into vertically aligned bundles for packaging comprising:
   a delivery conveyor having an advancing means associated with each stack to continuously move said stacks of material along a conveying surface in a uniform, spaced relationship relative to one another toward an accumulating area;
   means to continuously advance said delivery conveyor to successively deliver individual stacks of material horizontally into said accumulating area with means to retract said advancing means from contact with a related stack, when said individual stack is suitably delivered into said accumulating area;
   a vertical lifting mechanism positioned in said accumulating area and including:
     a chain drive means being mounted for orbital travel with upward and downward extending chain runs;
     an elevating finger means carried on said chain drive means; and
     a cam means and cam follower means associated with said elevating finger means to horizontally extend said elevating finger means in a stack supporting position when traveling along said upward chain run and to retract said elevating finger means in a clearance position when traveling along said downward chain run;
   a gathering frame positioned at said accumulating area and having a bundle supporting means associated therewith to support the said preformed stacks of material while a bundle is being formed; and
   a synchronizing power transmission means being driven by said delivery conveyor and arranged to drive said chain drive means whereby said elevating finger means lifts each preformed and aligned stack of material from said conveying surface when delivered into said accumulating area being spaced apart from succeeding stacks and individually elevates each preformed stack into said gathering frame whereupon said elevating finger means is retracted from said stack supporting position and the elevating stack of material is deposited on said bundle supporting means whereby elevated stacks of material are assembled into a bundle of a vertically aligned desired size.

2. The automatic bundle forming apparatus according to claim 1 wherein each said stack of material comprises a predetermined quantity of loosely stacked flattened bags and when lifted into the gathering frame is added to the bottom of a bundle being assembled.

3. The automatic bundle forming apparatus according to claim 2 wherein said bundle supporting means includes a pair of catch plates which are pivotably carried at opposite sides of said gathering frame to support opposed edge positions of said preformed stacks of flattened bags while a bundle is being assembled.

4. The automatic bundle forming apparatus according to claim 3 wherein each catch plate includes a support ledge portion and a cam face portion and having a spring biasing means urging said support ledge and said cam face portions into said gathering frame in a bundle supporting position while permitting elevated stacks of flattened bags to deflect said catch plates outward by contact with said cam face portions when entering said gathering frame.

5. The automatic bundle forming apparatus according to claim 1 wherein said chain drive means includes a pair of spaced roller chains being driven in concert and said elevating finger means includes a series of spaced intermediate finger members and a pair of end finger members being all rigidly interconnected and horizontally aligned, each end finger member is pivotable supported from one of said roller chains for travel therewith.

6. The automatic bundle forming apparatus according to claim 5 wherein said cam follower means includes a pair of cam rollers and said cam means includes a pair of cam tracks, said end finger members each including a leg member to carry one of said cam rollers for guided movement along one of said cam tracks as said finger members move with said roller chains in said orbital travel.

7. The automatic bundle forming apparatus according to claim 6 wherein said conveying surface in said accumulating area is formed with spaced slots therein which cooperated with said finger members whereby a stack of material is supported in said accumulating area on said conveying surface and said slots allow said finger members to move therethrough to lift said stack of material from said conveying surface.

8. The automatic bundle forming apparatus according to claim 7 wherein said synchronizing power transmission means includes roller chain and sprocket means to provide a given speed ratio between said delivery conveyor and said drive chain means such that the said elevating finger means makes one complete orbital cycle during the time that said delivery conveyor advance one stack of material into the accumulating area whereby said stack spaced relationship is maintained while each preformed stack is delivered into said accumulating area.

9. The automatic bundle forming apparatus according to claim 6 wherein each of the pair of roller chains of said chain drive means is guided along their upward extending chain runs by chain guides whereby said chain guides and said cam followers accurately hold said finger members in said stack supporting position.

* * * * *